US007057499B2

(12) United States Patent
Kanemitsu

(10) Patent No.: US 7,057,499 B2
(45) Date of Patent: Jun. 6, 2006

(54) COMMUNICATION SYSTEM FOR COMMUNICATING BETWEEN MOVING OBJECTS AND VEHICULAR DRIVING SUPPORT APPARATUS

(75) Inventor: Hiroyuki Kanemitsu, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 124 days.

(21) Appl. No.: 10/779,639

(22) Filed: Feb. 18, 2004

(65) Prior Publication Data

US 2004/0174977 A1 Sep. 9, 2004

(30) Foreign Application Priority Data

Mar. 4, 2003 (JP) .............................. 2003-057641

(51) Int. Cl.

| | |
|---|---|
| ***B60Q 1/00*** | (2006.01) |
| ***G08G 1/00*** | (2006.01) |
| ***G08G 1/09*** | (2006.01) |
| ***G08G 1/16*** | (2006.01) |
| ***G08B 1/08*** | (2006.01) |
| ***B60R 22/00*** | (2006.01) |
| ***G06F 17/10*** | (2006.01) |

(52) U.S. Cl. ...................... 340/435; 340/436; 340/902; 340/903; 340/904; 340/905; 340/539.1; 340/539.13; 340/426.16; 701/45; 701/301; 701/302

(58) Field of Classification Search ........ 340/435–436, 340/902–903, 426.16, 426.19; 342/357.07, 342/357.08; 701/300–302, 213, 45
See application file for complete search history.

(56) References Cited

U.S. PATENT DOCUMENTS

| | | | | |
|---|---|---|---|---|
| 5,153,559 | A * | 10/1992 | Atsumi | 340/435 |
| 5,424,726 | A * | 6/1995 | Beymer | 340/902 |
| 6,362,748 | B1 * | 3/2002 | Huang | 340/901 |
| 6,662,108 | B1 * | 12/2003 | Miller et al. | 701/301 |

FOREIGN PATENT DOCUMENTS

| | | |
|---|---|---|
| JP | A 4-290200 | 10/1992 |
| JP | A 2000-311294 | 11/2000 |
| JP | A 2000-357292 | 12/2000 |

* cited by examiner

*Primary Examiner*—Jeffery Hofsass
*Assistant Examiner*—Lam Pham
(74) *Attorney, Agent, or Firm*—Kenyon & Kenyon LLP

(57) ABSTRACT

In a communication system for communicating between moving objects in which a moving object determines the peripheral state based on moving object information transmitted and received using communication between moving objects, accuracy level information regarding the apparatus provided in the transmitting moving object is included in moving object information. Further, a vehicular driving support apparatus that transmits moving object information using communication between moving objects includes accuracy level information regarding the apparatus provided in a host vehicle in moving object information.

12 Claims, 3 Drawing Sheets

COMMUNICATION SYSTEM FOR COMMUNICATING BETWEEN MOVING OBJECTS AND VEHICULAR DRIVING SUPPORT APPARATUS

INCORPORATION BY REFERENCE

The disclosure of Japanese Patent Application No. 2003-057641 filed on Mar. 4, 2003, including the specification, drawings and abstract is incorporated herein by reference in its entirety.

BACKGROUND OF THE INVENTION

1. Field of the Invention

The invention relates generally to a communication system and apparatus for communicating between moving objects. More specifically, the invention relates to a communication system for communicating between moving objects in which a moving object determines the peripheral state based on moving object information transmitted and received using communication between moving objects, and a vehicular driving support apparatus that is able to be used in that communication system.

2. Description of the Related Art

JP(A) 4-290200 discloses a system and apparatus which receives running data, such as positional information and speed information, from another vehicle using vehicle-to-vehicle communication and presents information relating to the running state of the other vehicle around a host vehicle to an occupant of the host vehicle.

Being able to grasp the running state of another vehicle around the host vehicle in this way is helpful, for example, for determining the possibility of intersecting with the other vehicle and warning the driver when there is an increased level of danger.

However, in the aforementioned system and apparatus, the type of information included in the running data transmitted from the vehicle, as well as the accuracy of that information, relies on the presence and performance of the apparatus in the vehicle from which the information was sent, and is therefore not always consistent among vehicles.

When running data transmitted from a plurality of other vehicles is received by the host vehicle, the difference or dispersion among the running data that can occur due to the difference in the accuracy level of the apparatuses in the vehicles that transmitted the data effects the accuracy when determining the running states of the other vehicles around the host vehicle.

SUMMARY OF THE INVENTION

In view of the foregoing problems, this invention thus provides a communication system and apparatus for communicating between moving objects which enables a moving object to determine the peripheral state taking into account the accuracy level of an apparatus provided in another moving object which transmits information, when determining the peripheral state based on moving object information received using communication between moving objects.

According to a first aspect of the invention, a communication system for communicating between moving objects includes at least one moving object which has a transmitting portion that transmits moving object information using communication between moving objects; and a second moving object which has a receiving portion that receives the moving object information of the first moving object that was transmitted by the first moving object, and a determining portion that determines a peripheral state around the second moving object based on the moving object information which includes accuracy level information regarding an apparatus provided in the first moving object and which was transmitted by the first moving object.

In this aspect of the invention, the term "moving object" is used broadly to cover vehicles, two-wheeled vehicles, automobiles, pedestrians, and wheel chairs and the like, for example. The term "moving object information" includes, for example, positional information, speed information, and identification information (moving object identification of the vehicle or pedestrian or the like) of the moving object that transmits information (hereinafter also referred to as the "transmitting moving object"). The term "apparatus" refers mainly to equipment for detecting and measuring various information included in the moving object information. The term "accuracy level" indicates the level of performance of the apparatus (for example, the resolution or accuracy) or the different types of apparatuses that are present. The higher the performance or the more types of apparatuses there are, the higher the accuracy level.

According to this aspect of the invention, the moving object that has received moving object information from another moving object is able to grasp the kind of apparatus used to detect and measure the positional information and traveling speed information included in the received moving object information, as well as the level of accuracy of that information.

Accordingly, when determining the peripheral state based on the received moving object information, it is possible to make that determination after taking into account the accuracy of the various information. For example, the determining portion may accurately determine the peripheral state using only moving object information in which the accuracy level indicated by the accuracy level information is a predetermined level of accuracy or higher.

In this aspect of the invention, the second moving object can also generate moving object information for the second moving object using the moving object information in which the accuracy level indicated by the accuracy level information is the highest level of accuracy. For example, it is possible to generate positional information of the second moving object by using the map data portion from the positional information indicated by the most detailed map data from among the received moving object information and mapping the second moving object information on the map data.

In this aspect of the invention, it is also preferable to include in the accuracy level information, information such as that which indicates whether a specified apparatus is provided in the first moving object (such as a navigation system) as well as information relating to the specified accuracy of the information regarding the specified apparatus (such as the resolution, accuracy, version (edition) and the like of the map data base of the navigation system).

According to a second aspect of the invention, a driving support apparatus for a vehicle includes a transmitting portion which transmits moving object information of the vehicle using communication between moving objects, and an information control portion which includes accuracy level information regarding an apparatus provided in the vehicle in the moving object information to be transmitted.

According to a second aspect of the invention, a driving support apparatus for a vehicle includes a receiving portion which receives moving object information transmitted from at least one moving object via communication between moving objects, the moving object information including accuracy level information regarding an apparatus provided in the at least one moving object; and a determining portion which determines a peripheral state around the vehicle using the received moving object information.

According to this aspect as well, the term “moving object” is used broadly to cover vehicles, two-wheeled vehicles, automobiles, pedestrians, and wheel chairs and the like, for example. The term “moving object information” includes, for example, positional information, speed information, and identification information (moving object identification of the vehicle or pedestrian or the like) of the moving object that transmits information (hereinafter also referred to as the “transmitting moving object”). The term “apparatus” refers mainly to equipment for detecting and measuring various information included in the moving object information. The term “accuracy level” indicates the level of performance of the apparatus (for example, the resolution or accuracy) or the different types of apparatuses that are present. The higher the performance or the more types of apparatuses there are, the higher the accuracy level.

According to this aspect of the invention, the other vehicle or other moving object that has received moving object information is able to grasp the kind of apparatus used to detect and measure the positional information and traveling speed information included in the received moving object information, as well as the level of accuracy of that information.

In this aspect of the invention as well, it is also preferable to include in the accuracy level information, information such as that which indicates whether a specified apparatus is provided in the at least one moving object (such as a navigation system) as well as information relating to the specified accuracy of the information regarding the specified apparatus (such as the resolution, accuracy, version (edition) and the like of the map data base of the navigation system).

In any of the foregoing aspects of the invention, transmission of this moving object information is preferably done by broadcast at predetermined intervals in order to more widely distribute the information.

The driving support apparatus in the third aspect of the invention may also include an accuracy level analyzing portion which i) analyzes the accuracy level information included in the moving object information of the at least one moving object, which was transmitted from the at least one moving object, ii) compares an accuracy level of the accuracy level information of the vehicle with an accuracy level of the analyzed the accuracy level information, and iii) and extracts the accuracy level information having the highest accuracy level from thereamong; and an intersecting possibility determining portion which determines the running state of the at least one moving object around the vehicle using the moving object information having the extracted accuracy level, and determines the possibility of intersection between the vehicle and the at least one moving object.

The intersecting possibility determining portion in the third aspect of the invention may also grasp the relative positional relationship between the vehicle and the at least one moving object in relation to an intersection ahead of the vehicle using information of the highest accuracy from among the map data of the vehicle and all of the at least one moving object with which communication is possible, and determine the possibility of intersection between the vehicle and the at least one moving object.

The intersecting possibility determining portion in this aspect of the invention may also determine the possibility of intersection using only positional information having a predetermined accuracy level or higher, taking into account the accuracy of all of the positional information of the vehicle and the at least one moving object revealed by the received accuracy level information of the at least one moving object.

The driving support apparatus in the third aspect of the invention may also include an information providing portion which provides at least one of information and a warning to a driver regarding the presence of at least one moving object with which the possibility of intersection with the vehicle is high, based on the determination results of the intersecting possibility determining portion.

BRIEF DESCRIPTION OF THE DRAWINGS

The foregoing and further objects, features, and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
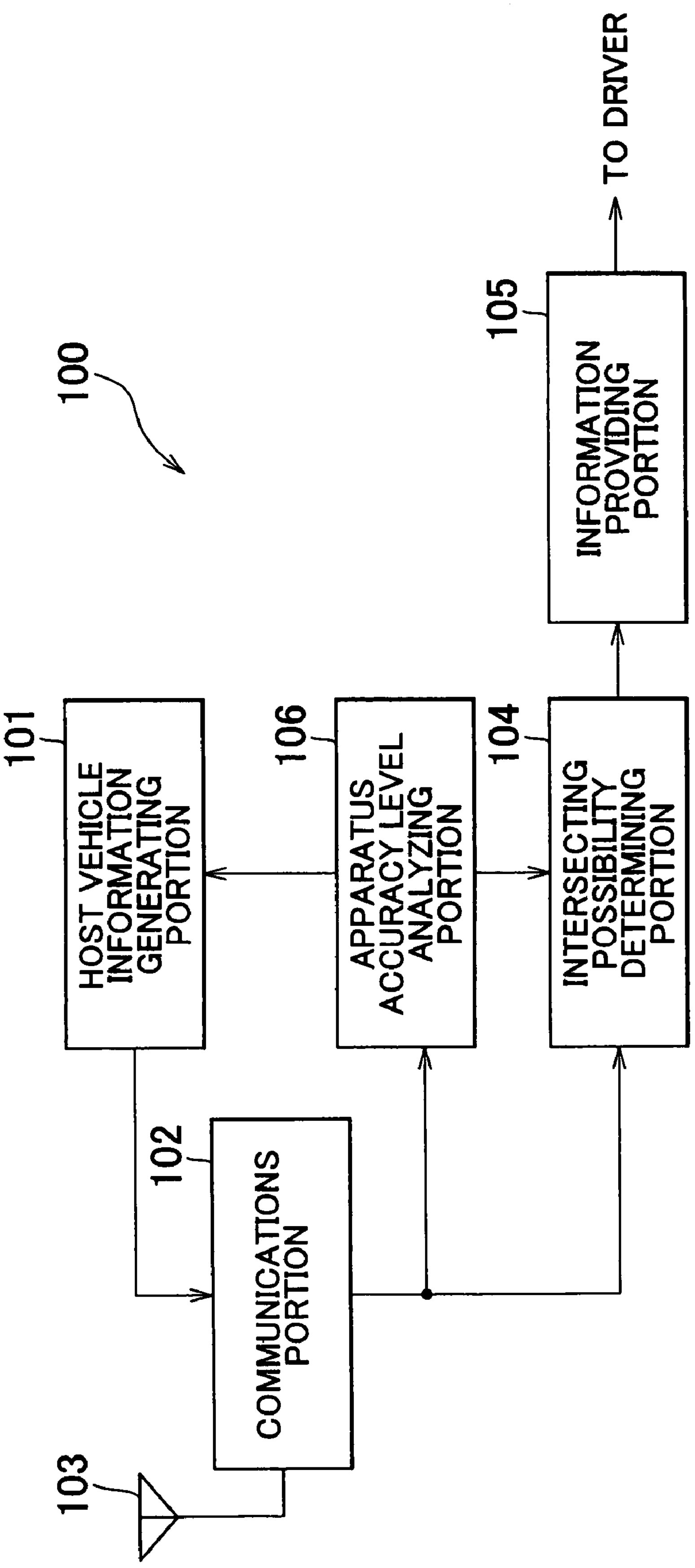
FIG. 1 is a block diagram schematically showing a vehicular driving support apparatus according to one exemplary embodiment of the invention.

One exemplary embodiment of the invention will hereinafter be described with reference to the appended drawings. A vehicular driving support apparatus according to this exemplary embodiment provides communication between one moving object and another moving object using a communication system for communicating between moving objects. The communication target is not limited to a vehicle, but for convenience, this exemplary embodiment will be described with respect to vehicle-to-vehicle communication, wherein all moving objects, including a host vehicle, are vehicles.

Further, in this exemplary embodiment, the host vehicle is provided with a navigation system, not shown. However, there may be other vehicles without a navigation systems among the other vehicles that use communication between moving objects.

A driving support apparatus 100 has a host vehicle information generating portion 101 that generates moving object information related to the host vehicle. This moving object information includes, for example, positional information, speed information, and identification information (moving object identification of, for example, a vehicle or pedestrian) of a host moving object, as described above. In this exemplary embodiment, the host vehicle information generating portion 101 includes in the moving object information for the host vehicle, host vehicle accuracy level information in addition to the positional information, running speed information, and identification information of the host vehicle.

As described above, the accuracy level information includes, for example, information indicating whether a specified apparatus is provided and information relating to the particular accuracy of information regarding the specified apparatus. In this exemplary embodiment, the host vehicle information generating portion 101 includes in the accuracy level information at least 1) information relating to whether a navigation system is provided, and, if a navigation system is provided, 2) information relating to the accuracy of the information of the system, such as the resolution, accuracy (for example, the probability of the correct position being within X meters of the displayed position is Y %), and version (edition) and the like of the map data base of the system.

In this exemplary embodiment, the method by which the host vehicle information generating portion 101 detects and obtains each piece of moving object information may be arbitrarily selected. For example, the positional information may be generated by mapping the positional data obtained by a GPS receiver (not shown) on map data within a navigation system (not shown) and the speed information can be obtained with a vehicle speed sensor (not shown). Also, the accuracy level information may be input, set, and changed by the user via a user interface of the navigation system, for example, or automatically detected, obtained, and updated by detection of electrical connections.

The moving object information generated by the host vehicle information generating portion 101 is then transmitted via an antenna 103 by a communications portion 102. In this exemplary embodiment, the transmission of this moving object information may be performed by broadcast at predetermined intervals in order to widely distribute it to moving objects in the vicinity of the host vehicle. It is also possible, however, to transmit that information by unicast or multicast. Further, in this exemplary embodiment, the various pieces of information included in the moving object information are transmitted all together as a single unit of information. Alternatively, however, the various pieces of information may also be transmitted separately at different timings.

The driving support apparatus 100 is further provided with an intersecting possibility determining portion 104 which i) receives moving object information transmitted from another vehicle (i.e., moving object) via the antenna 103 and the communications portion 102, ii) determines the running state of the other vehicle around the host vehicle, and then iii) determines the possibility of intersection between the host vehicle and the other vehicle. In this invention, the method by which the intersecting possibility determining portion 104 determines that the possibility of intersection is high under a given circumstance is not limited to a particular method. In this technological field, various determination references and algorithms have been proposed for determining such a possibility of intersection. Any of these may be used.

The driving support apparatus 100 is further provided with an information providing portion 105 which provides information (and/or a warning) to the driver regarding the presence of another vehicle with which the possibility of intersection with the host vehicle is high, e.g., a vehicle that is about to enter, from a different direction, the intersection that the host vehicle is about to enter, based on the determination results of the intersecting possibility determining portion 104.

This information or warning may be provided visually on a display of the navigation system or on an instrument panel, or as a hologram virtual image on the front windshield, or it may be provided audibly as a sound from a speaker, or as a suitable combination of any of these. Also, the specific content and the timing of provision of at least one of the provided information and warning are also arbitrary.

The driving support apparatus 100 is further provided with an accuracy level analyzing portion 106 that analyzes the accuracy level information included in the moving object information that was received from the other vehicle. More specifically, in this exemplary embodiment the accuracy level analyzing portion 106 at the very least 1) analyzes whether the transmitting vehicle is provided with a navigation system, and, if the transmitting vehicle is provided with a navigation system, 2) analyzes the accuracy of the information of the map data base stored in the system. The details of the analyzing process will be described later.

Figure 2A:
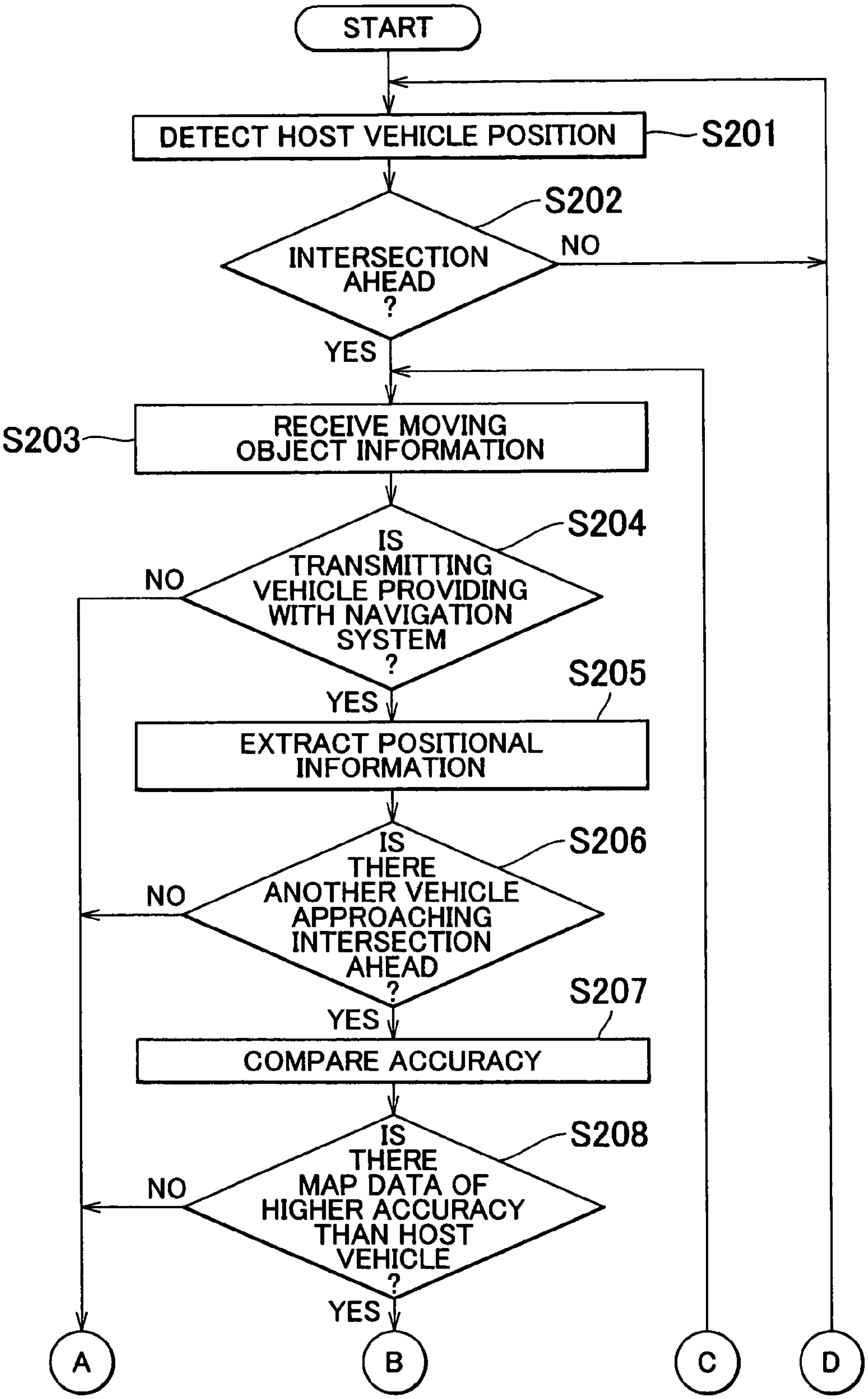
FIGS. 2A, 2B are first and second halves of a flowchart illustrating the flow of processes executed by the vehicular driving support apparatus according to the exemplary embodiment of the invention.
Figure 2B:
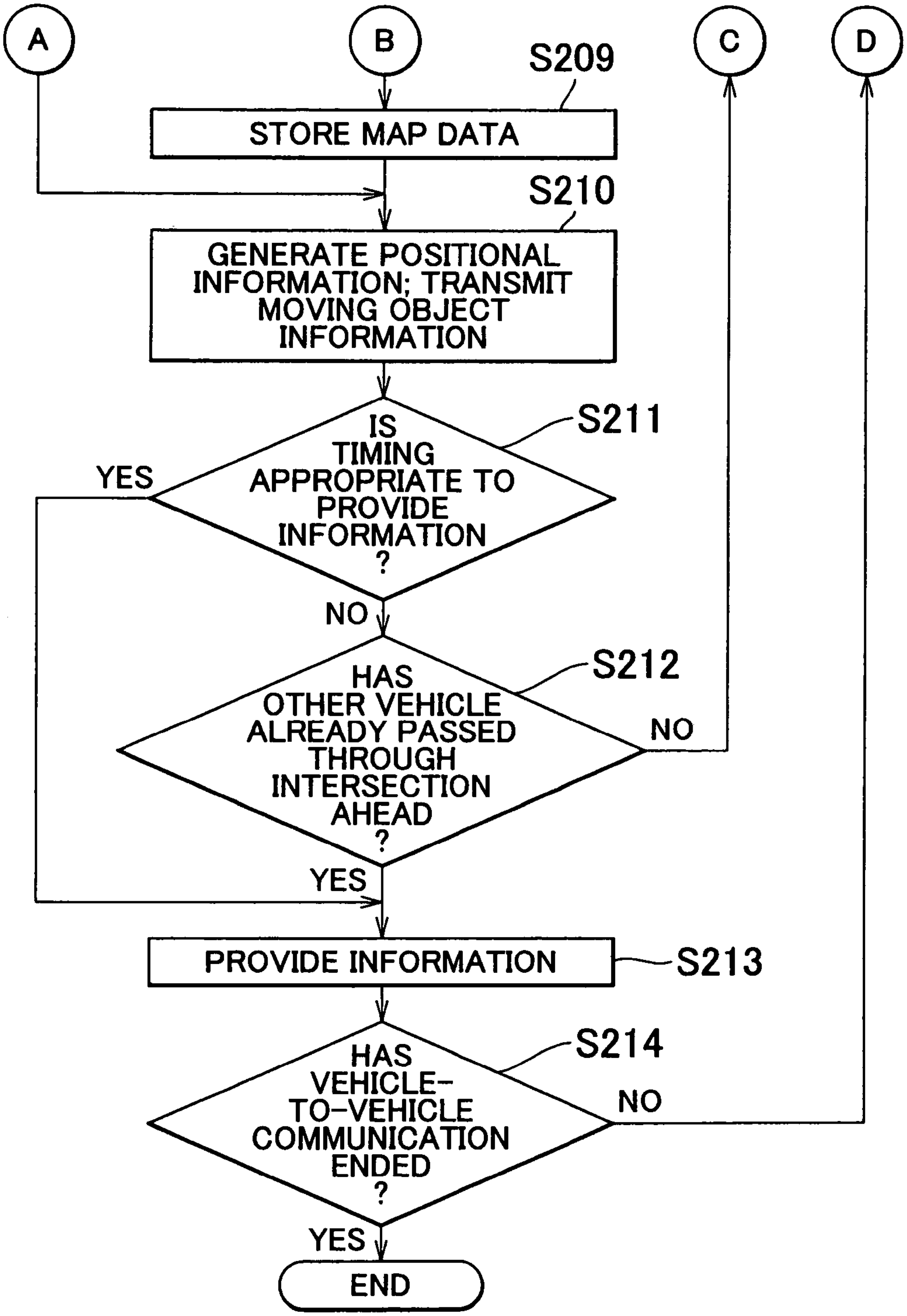

Presuming the aforementioned structure, the operation of the driving support apparatus according to the exemplary embodiment will hereinafter be described with reference to FIG. 2A, 2B. FIG. 2A, 2B are first and second halves of a flowchart showing the flow of the processes executed by the vehicular driving support apparatus 100 according to the exemplary embodiment of the invention.

When the driving support apparatus 100 is activated by the engine being started up (ignition ON), for example, the current position of the host vehicle is first detected (step S201) and checked against the map data base (not shown). This current position of the host vehicle is then either constantly or periodically monitored to see whether an intersection is present ahead of the vehicle (step S202).

If an intersection is discovered ahead (i.e., YES in step S202), it is determined that there is a possibility of intersection with another vehicle so the moving object information broadcast from other vehicles around the host vehicle is received (step S203).

If moving object information is received from one or more other vehicles, the accuracy level analyzing portion 106 then analyzes the accuracy level information included in the various moving object information and determines whether the vehicle that transmitted the moving object information is provided with a navigation system (step S204).

If none of the one or more vehicles that transmitted the moving object information that was received are provided with a navigation system (i.e., NO in step S204), it is presumed that the positional information to be included in the map data is not included in the moving object information that was received so the map data from the other vehicle can not be used. Therefore, the routine proceeds directly to step S210 (to be described later) and positional information is generated by the apparatus provided in the host vehicle.

On the other hand, if, from among the one or more vehicles that transmitted moving object information that was received, there is at least one vehicle that is provided with a navigation system (i.e., YES in step S204), it is presumed that positional information is included in the moving object information transmitted from the one or more vehicles. Therefore, the positional information is extracted from the moving object information received by the intersecting possibility determining portion 104.

Next, the intersecting possibility determining portion 104 determines whether the vehicle that transmitted the positional information that was extracted is about to enter the intersection that is ahead of the host vehicle that was detected in step S202 (step S206).

If the transmitting vehicle is not about to enter the intersection that is ahead of the host vehicle (i.e., NO in step S206), it is determined that map data of the intersection is not included in the positional information included in the moving object information of the transmitting vehicle so the routine proceeds directly to step S210 (to be described later), and positional information is generated by the apparatus provided in the host vehicle.

On the other hand, if the transmitting vehicle is about to enter the intersection that is ahead of the host vehicle (i.e., YES in step S206), it is presumed that map data of the intersection is included in the positional information included in the moving object information of the transmitting vehicle. Next, the accuracy level analyzing portion 106 extracts the information regarding the accuracy of the map data included in the received positional information from the accuracy level information of the transmitting vehicle, and compares it with the accuracy of the map data base provided in the host vehicle (step S207).

If map data of a higher accuracy than that of the host vehicle is not included (i.e., NO in step S208), the routine proceeds directly on to step S210 (to be described later), and positional information is generated by the apparatus provided in the host vehicle.

On the other hand, if positional information indicated using map data of a higher accuracy than that of the host vehicle is included (i.e., YES in step S208), that map data is stored (step S209).

Next, the host vehicle information generating portion 101 generates positional information for the host vehicle and transmits it, along with other information, as moving object information by broadcast (step S210).

Here, when map data of the intersection ahead of the host vehicle that is of greater accuracy than the map data base of the host vehicle is stored in step S209, the host vehicle information generating portion 101 maps the positional data detected, for example, by the GPS receiver on the stored map data without referring to the map data base provided in the host vehicle, and makes that data the positional information for the host vehicle.

Accordingly, the driving support apparatus 100 according to the exemplary embodiment is able to improve the accuracy of the positional information transmitted from the host vehicle by using the map data of the other vehicle that is of higher accuracy than that of the host vehicle. If all of the vehicles that are about to enter the same intersection are provided with the apparatus 100, then the accuracy of the map data included in the positional information sent from each of the vehicles is able to be brought up to that of the map data of the vehicle with the highest accuracy level of all of the vehicles.

On the other hand, if the map data is not stored in step S209 (i.e., NO in step S204, NO in step S206, or NO in step S208), the host vehicle information generating portion 101 generates the positional information as usual, referencing the map data base provided in the host vehicle.

Next it is determined whether the timing is appropriate to provide the information (and/or warning) regarding the intersecting possibility determination to the driver (step S211). If the timing is appropriate (i.e., YES in step S211), the routine proceeds directly on to step S213 and the information is provided.

On the other hand, if the timing is not appropriate to provide the information (i.e., NO in step S211), it is determined whether the other vehicle has already passed through the intersection ahead of the host vehicle that was detected in step S202. If the other vehicle has already passed through the intersection (i.e., YES in step S212), the routine proceeds directly on to step S213 and the information is provided. If the other vehicle has not yet passed through the intersection, the moving object information is again received from the other vehicle around the host vehicle (the routine returns to step S203).

The timing at which the information (step S211) is provided may be set arbitrarily; for example, it may be set such that the information is provided 150 meters before the intersection.

Similarly, the specific content of the information provided in step S213 and the method by which it is provided is also arbitrary. For example, in addition to indicating both the current position of the host vehicle and the position of the other vehicle with which the possibility of intersection is determined to be high on a display of a navigation system, it is possible to visually provide a warning indicating that there is an intersecting vehicle on the display, as well as to audibly indicate that warning with a sound, for example.

With the information provided in step S213, the relative positional relationship between the vehicles in relation to the intersection ahead is able to be grasped with the highest accuracy from among the map data of vehicles that may intersect, including that of the host vehicle, and the possibility of intersection is then determined. Here, the accuracy of all of the positional information revealed by all of the accuracy level information received is also taken into consideration, and a process such as one which uses only positional information equal to, or greater than, a predetermined level of accuracy, or one which ignores positional information equal to, or less than, a predetermined level of accuracy, may be used for example.

In this way, according to this exemplary embodiment, when positional information including map data of a higher accuracy than that of the host vehicle is received from another vehicle, it is possible to generate positional information for the host vehicle using that map data.

Also according to the exemplary embodiment, it is possible to increase the accuracy of determining the possibility of vehicles intersecting by taking into account the accuracy of the positional information received when the intersecting possibility determination is made.

Furthermore, when a plurality of vehicles provided with the driving support apparatus according to this exemplary embodiment are about to enter the same intersection, the accuracy of the intersecting possibility determination is improved because it is possible for each vehicle to grasp the relative positional relationships with each vehicle with the map data having the highest accuracy, by all of the vehicles exchanging positional information and then comparing the accuracy of all of the positional information from all of the vehicles.

In this exemplary embodiment, a case in which the host vehicle is about to enter an intersection was described as one example of a traffic situation in which the possibility of the host vehicle and another vehicle intersecting increases. The invention is not limited to this, however, and can also function in the same way with a T-shaped intersection or a sudden curve where the visibility is poor, or the like.

Also, as described above, the vehicular driving support apparatus according to the exemplary embodiment is one example of a communications apparatus that can be mounted on a moving object, carried around by a moving object, and use the moving object communication system according to this invention. The moving object communication system according to this invention can also use a moving object other than a vehicle. Accordingly, it is also possible to use the moving object communication system according to the invention with an apparatus having the same structure and function as the vehicular driving support apparatus according to the foregoing exemplary embodiment, which can be carried around by a pedestrian or a person riding in a vehicle, or mounted to a two-wheeled vehicle or a wheel chair.

Also, in the block diagram of FIG. 1, the driving support apparatus is described provided with both a transmitting system for transmitting moving object information about the host vehicle and a receiving system for determining the possibility of intersection based on the moving object information received from another moving object. Alternatively, however, the moving object communication system according to the invention may have an apparatus which has only the transmitting system or only the receiving system. A transmitter that is carried around by or on a pedestrian or a person riding in a vehicle or the like, as described above, can be used as the apparatus provided with only the transmitting system.

Further, structural elements shown in the block diagram of FIG. 1 and other already known structural elements that have been omitted from the drawings due to the fact that they are apparent to those skilled in the art may be realized by one or a plurality of hardware, software, or a combination of the two.

As described above, according to the exemplary embodiment, it is possible to provide a system and apparatus for communicating between moving objects which enables a moving object to determine the peripheral state taking into account the accuracy level of an apparatus provided in another moving object which transmits information, when determining the peripheral state based on moving object information received using communication between moving objects.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A communication system for communicating between moving objects, comprising:

a transmitting portion provided in at least one of first moving object, which transmits moving object information that includes accuracy level information regarding an apparatus provided in the first moving object to a second moving object using communication between moving objects, wherein the accuracy level information includes information indicating whether a specified apparatus is provided in the first moving object;

a receiving portion provided in the second moving object, which receives the transmitted moving object information; and a determining portion provided in the second moving object, which determines a peripheral state around the second moving object based on the received moving object information.

2. The communication system according to claim 1, wherein the accuracy level information includes information relating to the accuracy of information regarding the specified apparatus.

3. A communication system for communicating between moving objects, comprising:

a transmitting portion provided in at least one of first moving object, which transmits moving object information that includes accuracy level information regarding an apparatus provided in the first moving object to a second moving object using communication between moving objects a receiving portion provided in the second moving object, which receives the transmitted moving object information; and a determining portion provided in the second moving object, which determines a peripheral state around the second moving object based on the received moving object information, wherein the determining portion determines the peripheral state using only moving object information in which an accuracy level indicated by the accuracy level information is a predetermined level of accuracy or higher.

4. A communication system for communicating between moving objects, comprising:

a transmitting portion provided in at least one of first moving object, which transmits moving object information that includes accuracy level information regarding an apparatus provided in the first moving object to a second moving object using communication between moving objects a receiving portion provided in the second moving object, which receives the transmitted moving object information;

a determining portion provided in the second moving object, which determines a peripheral state around the second moving object based on the received moving object information; and a generating portion provided in the second moving object, which generates moving object information for the second moving object using the moving object information in which an accuracy level indicated by the accuracy level information is the highest level of accuracy among the moving object information transmitted from the transmitting portion and the moving object information of the second moving object.

5. A driving support apparatus for a vehicle, comprising:

a transmitting portion which transmits moving object information of the vehicle using communication between moving objects; and an information control portion which includes accuracy level information regarding an apparatus provided in the vehicle in the moving object information to be transmitted, wherein the accuracy level information includes information indicating whether a specified apparatus is provided in the vehicle.

6. The driving support apparatus according to claim 5, wherein the accuracy level information includes information relating to the accuracy of information regarding the specified apparatus.

7. A driving support apparatus for a vehicle, comprising:

a receiving portion which receives moving object information transmitted from at least one moving object that is different from the vehicle via communication between moving objects, the moving object information including accuracy level information regarding an apparatus provided in the at least one moving object, wherein the accuracy level information includes information indicating whether a specified apparatus is provided in the at least one moving object; and a determining portion which determines a peripheral state around the vehicle using the received moving object information.

8. The driving support apparatus according to claim 7, wherein the accuracy level information includes information relating to the accuracy of information regarding the specified apparatus.

9. A driving support apparatus for a vehicle, comprising:

a receiving portion which receives moving object information transmitted from at least one moving object that is different from the vehicle via communication between moving objects, the moving object information including accuracy level information regarding an apparatus provided in the at least one moving object;

a determining portion which determines a peripheral state around the vehicle using the received moving object information;

an accuracy level analyzing portion which i) analyzes the accuracy level information included in the moving object information of the at least one moving object, which was transmitted from the at least one moving object, ii) compares an accuracy level of the accuracy level information of the vehicle with an accuracy level of the analyzed the accuracy level information, and iii) and extracts the accuracy level information having the highest accuracy level from thereamong; and an intersecting possibility determining portion which determines the running state of the at least one moving object around the vehicle using the moving object information having the extracted accuracy level, and determines the possibility of intersection between the vehicle and the at least one moving object.

10. The driving support apparatus according to claim 9, wherein the intersecting possibility determining portion grasps the relative positional relationship between the vehicle and the at least one moving object in relation to an intersection ahead of the vehicle using information of the highest accuracy from among the map data of the vehicle and all of the at least one moving object with which communication is possible, and determines the possibility of intersection between the vehicle and the at least one moving object.

11. The driving support apparatus according to claim 9, wherein the intersecting possibility determining portion determines the possibility of intersection using only positional information having a predetermined accuracy level or higher, taking into account the accuracy of all of the positional information of the vehicle and the at least one moving object revealed by the accuracy level information of the at least one moving object.

12. The driving support apparatus according to claim 9, further comprising an information providing portion which provides at least one of information and a warning regarding the presence of at least one moving object with which the possibility of intersection with the vehicle is high to a driver based on the determination results of the intersecting possibility determining portion.

* * * * *